US009841890B2

(12) United States Patent
Kitao et al.

(10) Patent No.: US 9,841,890 B2
(45) Date of Patent: Dec. 12, 2017

(54) INFORMATION PROCESSING DEVICE AND INFORMATION PROCESSING METHOD FOR IMPROVING OPERABILITY IN SELECTING GRAPHICAL USER INTERFACE BY GENERATING MULTIPLE VIRTUAL POINTS OF CONTACT

(75) Inventors: Takashi Kitao, Tokyo (JP); Katsuya Hyodo, Kanagawa (JP); Arito Mochizuki, Tokyo (JP)

(73) Assignees: SONY CORPORATION, Tokyo (JP); SONY INTERACTIVE ENTERTAINMENT, INC., Tokyo (JP)

( * ) Notice: Subject to any disclaimer, the term of this patent is extended or adjusted under 35 U.S.C. 154(b) by 249 days.

(21) Appl. No.: 13/611,239

(22) Filed: Sep. 12, 2012

(65) Prior Publication Data
US 2013/0139079 A1   May 30, 2013

(30) Foreign Application Priority Data
Nov. 28, 2011   (JP) .................................. 2011-259554

(51) Int. Cl.
G06F 3/048 (2013.01)
G06F 3/041 (2006.01)
G06F 3/00 (2006.01)
G06F 3/0488 (2013.01)

(52) U.S. Cl.
CPC ............ G06F 3/0488 (2013.01); G06F 3/041 (2013.01); G06F 3/00 (2013.01)

(58) Field of Classification Search
CPC .......... G06F 3/048; G06F 3/041; G06F 3/033; G06F 3/00; G09G 5/00; G06K 9/46

USPC ......................................................... 715/764
See application file for complete search history.

(56) References Cited

U.S. PATENT DOCUMENTS 5,168,531 A  * 12/1992  Sigel ............................. 382/291
6,259,436 B1 *  7/2001  Moon et al. .................. 345/173
6,411,283 B1 *  6/2002  Murphy ........................ 345/173
(Continued)

FOREIGN PATENT DOCUMENTS

CN    101878056    11/2010
CN    102257457    11/2011
(Continued)

OTHER PUBLICATIONS

Notification of Reason(s) for Refusal dated Oct. 1, 2013, from corresponding Japanese Application No. 2011-259554.
(Continued)

*Primary Examiner* — Jennifer To
*Assistant Examiner* — Hugo Molina
(74) *Attorney, Agent, or Firm* — Katten Muchin Rosenman LLP

(57) ABSTRACT

A plurality of GUIs are displayed on the screen of a display. A hit determination area of each GUI is defined within a graphic of the GUI. When a user touches a point of contact, four virtual points of contact are generated in the shape of a 'V' within the screen. A GUI desired to be selected by the user is identified according to a predetermined rule by referring to whether points of contact are located within each hit determination area, the number of points of contact, the priority level defined for each GUI, etc.

13 Claims, 7 Drawing Sheets

(56) References Cited

U.S. PATENT DOCUMENTS

| | | | |
|---|---|---|---|
| 2004/0165010 A1* | 8/2004 | Robertson | G06F 3/0481 715/805 |
| 2007/0097096 A1* | 5/2007 | Rosenberg | G06F 1/1626 345/173 |
| 2010/0079501 A1* | 4/2010 | Ikeda et al. | 345/661 |
| 2010/0125816 A1* | 5/2010 | Bezos | 715/863 |
| 2010/0182264 A1* | 7/2010 | Hahn | G06F 1/1626 345/173 |
| 2011/0084922 A1 | 4/2011 | Rider et al. | |
| 2011/0086674 A1* | 4/2011 | Rider | G06F 3/0416 455/566 |
| 2011/0102464 A1* | 5/2011 | Godavari | 345/650 |
| 2011/0205178 A1* | 8/2011 | Yoshida | G06F 1/1616 345/173 |
| 2011/0285665 A1* | 11/2011 | Matsumoto | G06F 3/044 345/174 |
| 2012/0327122 A1* | 12/2012 | Imamura | 345/649 |
| 2013/0002565 A1* | 1/2013 | Tumanov | G06F 1/1626 345/173 |
| 2013/0007653 A1* | 1/2013 | Stolyarov et al. | 715/784 |
| 2013/0038540 A1* | 2/2013 | Anderson | G06F 3/0488 345/173 |
| 2013/0145320 A1* | 6/2013 | Oosterholt | G06F 3/04812 715/823 |

FOREIGN PATENT DOCUMENTS

| | | |
|---|---|---|
| EP | 2290515 | 3/2011 |
| EP | 2385689 A1 | 11/2011 |
| JP | 2009-131495 | 6/2009 |
| JP | 2011-134127 A | 7/2011 |
| WO | 00/38042 A1 | 6/2000 |

OTHER PUBLICATIONS

Chinese First Office Action dated Feb. 28, 2015 from corresponding Application No. 201210477205.X.

Extended European Search Report dated Mar. 31, 2017 for the Corresponding European Patent Application No. 12191884.1.

* cited by examiner

| SHAPE | SIZE | COUNT | STARTING POINT |
|---|---|---|---|
| V | (5mm, 5mm) | 4 | (X1, Y1) |

26

INFORMATION PROCESSING DEVICE AND INFORMATION PROCESSING METHOD FOR IMPROVING OPERABILITY IN SELECTING GRAPHICAL USER INTERFACE BY GENERATING MULTIPLE VIRTUAL POINTS OF CONTACT

BACKGROUND OF THE INVENTION

1. Field of the Invention

The present invention relates to an information processing device for performing information processing accompanied by display of images, an information processing method used in the device, and a data structure of a content file.

2. Description of the Related Art

Recently, information devices designed for mobile use such as mobile game devices, cell phones, personal digital assistants (PDA), tablet terminals, etc. are popularly used. Due to size constraints and requirement for convenience that should be experienced in mobile use, input means for these devices is limited. As a result, unique input means and functions specialized for these devices have been developed.

For example, this has resulted in popularity of devices provided with a touch panel display that allows display and input in the same area. Introduction of a touch panel allows intuitive user operation. For example, the user can select and move an object such as an icon, enlarge/reduce a display screen showing a web page or a document, scroll the screen, turn pages, etc. as if the real thing is there in spite of the fact that only a two-dimensional screen is shown.

Regardless of whether a touch panel is used as an input means, it is common to display a graphical user interface (GUI) to start an application program and select a target of display, etc. For reasons of operability and viewability, there is an inherent limit to the reduction of the size of individual GUI's. Therefore, the smaller the screen size and the larger the number of GUI's displayed at a time, the smaller the interval between GUI's tends to be. This often results in an error particularly when the touch panel is controlled by a finger for user operation. For example, the user may select a GUI not intended to be selected. It has also forced creators of content displayed on the device to adjust the arrangement of hit determination areas of GUI's depending on the display environment.

SUMMARY OF THE INVENTION

The present invention addresses the above-described issue and a purpose thereof is to provide a technology capable of maintaining the operability experienced in selecting a GUI, regardless of the environment such as the device.

One embodiment of the present invention relates to an information processing device. The information processing device comprises: an input information acquisition unit configured to acquire a position of a point of designation designated by a user in a display image including GUIs (graphical user interfaces); a user operation content identification unit configured to locate virtual points of designation at positions determined according to the position of the point of designation on a plane that forms the display image, and select a single GUI by comparing GUIs with one another with reference to a relationship between the positions of the plurality of points of designation including the virtual points of designation and hit determination areas defined for respective GUIs; and an information processing unit configured to execute a process mapped to the selected GUI.

Another embodiment of the present invention relates to an information processing method. The information processing method comprises: acquiring a position of a point of designation designated by a user in a display image including GUIs (graphical user interfaces); locating virtual points of designation at positions determined according to the position of the point of designation on a plane that forms the display image, and selecting a single GUI by comparing GUIs with one another with reference to a relationship between the positions of the plurality of points of designation including the virtual points of designation and hit determination areas defined for respective GUIs; and executing information processing mapped to the selected GUI.

Still another embodiment of the present invention relates to a data structure of a content file. The data structure of a content file is configured to map: a program of content executed in an information processing device; to a contact point generation rule configuration file configured to define a rule for locating virtual points of contact generated according to a position of a point of designation, on a plane that forms a display image including GUIs (graphical user interfaces) displayed while content is being executed in the information processing device, the contact point generation rule configuration file being used to select a single GUI by comparing the GUIs with one another with reference to a relationship between positions of a plurality of points of designation, including the virtual points of designation generated by the information processing device by referring to the file while executing content, and hit determination areas defined for respective GUIs, and to execute a process mapped to the identified GUI Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
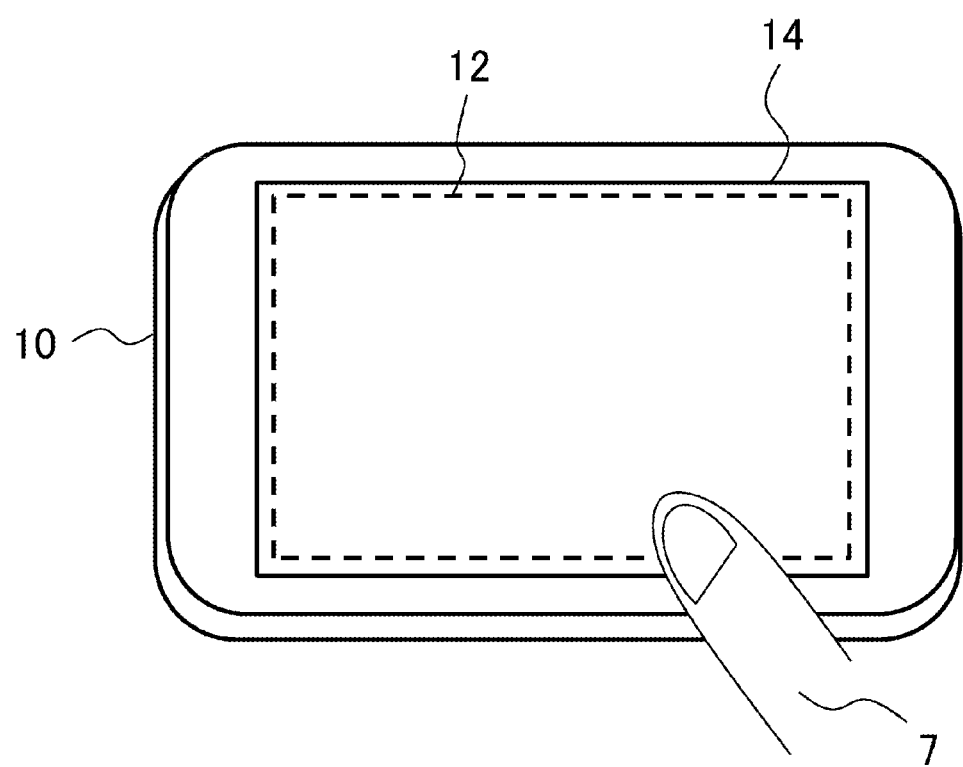
FIG. 1 shows the appearance of the information processing device according to an embodiment.

FIG. 1 shows the appearance of the information processing device according to an embodiment. The information processing device 10 may be any device built with display functions and other information processing functions, such as a cell phone, a PDA, a mobile game device, and a tablet terminal. Alternatively, a device having the appearance of the information processing device 10 shown in FIG. 1 may be used to display images and acknowledge input. The other information processing functions may be provided in a separate housing connected to the device. The information processing device 10 may be provided with various processing hardware depending on the required functions. Common technology may be used to implement the hardware so that a description thereof will be omitted.

The information processing device 10 is structured such that a display 14 is located on the front face of the device and a touch panel 12 covers the display 14. Hardware necessary for information processing such as a CPU, a graphics processor, a sound processor, and a memory is built behind the display 14 (not shown). The display 14 may be any common display such as a liquid crystal display, an electronic luminescence (EL) display, and a plasma display.

The touch panel 12 may be of any of practically used types such as resistance film type, optical type, and capacitive coupling type. A point of contact by a finger 7 or a stylus pen is detected by the touch panel 12. In addition, the information processing device 10 may be provided with a speaker for outputting sound, an earphone terminal, an infrared port or wireless LAN hardware for communication with other devices, and a battery box, etc. Illustration of these is omitted. The display 14 displays a menu screen, a screen necessary to provide user operation input such as icon arrangement, a screen showing results of information processing such as a game screen, a moving image screen, a text display screen, and a still image screen, depending on the functions of the information processing device 10.

Figure 2:
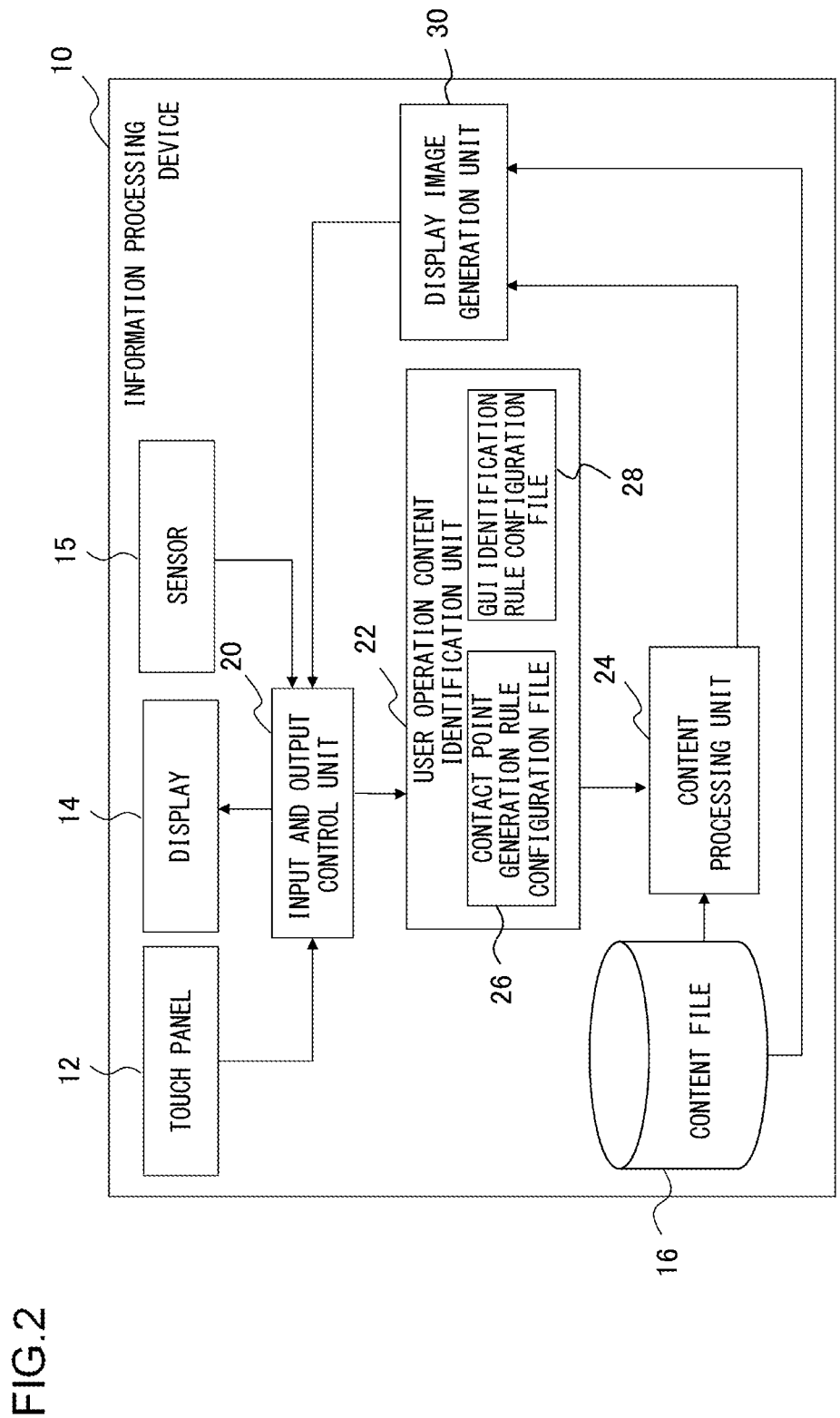
FIG. 2 shows the structure of the information processing device according to the embodiment in further detail.

FIG. 2 shows the structure of the information processing device 10 in further detail. In addition to the touch panel 12 and the display 14 described above, the information processing device 10 includes a sensor 15 for acquiring necessary information such as the position of a finger, a content storage unit 16 storing content programs and various data, an input and output control unit 20 for controlling reception of an input signal from the touch panel 12 and the sensor 15 and output of image data to the display 14, a user operation content identification unit 22 for converting an input signal from the touch panel into information indicating the content of user operation, a content processing unit 24 for processing content depending on the content of user operation, and a display image generation unit 30 for generating a display image.

The elements depicted in FIG. 2 as functional blocks for performing various processes are implemented by hardware such as a CPU, a main memory, or other LSI's, and by software such as a programs etc., for processing content and images. Therefore, it will be obvious to those skilled in the art that the functional blocks may be implemented in a variety of manners by hardware only, software only, or a combination of thereof.

The sensor 15 may be implemented by a touch panel provided on the rear face of the information processing device 10, a sensor provided on the display 14 and capturing a shadow or figure of a finger, etc. located above the display 14 as an image, or an acceleration sensor or a gyro sensor provided inside the device to sense the angle of the tilt of the display 14. As described later, the sensor 15 is provided to collect auxiliary information to improve precision of processing and may not be provided depending on the case.

The input and output control unit 20 is connected to the touch panel 12, the display 14, and the sensor 15 in a known method and controls input and output of data. The input signal received from the touch panel 12 indicates the coordinates of a point of contact by the user on the touch panel 12, a migration path of the coordinates occurring when the point of contact moves continuously, etc. Methods of detecting a point of contact on the touch panel 12 vary depending on the type and will not be discussed here. Touch-style user operation on the touch panel 12 may be performed by a body part other than a finger or by a tool like a stylus pen but will be exemplified below by a finger operation. The input and output control unit 20 also receives data acquired by the sensor 15 or outputs a video signal of a display image to the display 14.

The content file storage unit 16 stores various data necessary for information processing for displaying content in accordance with, for example, the user's touch panel operation. The "content" is exemplified by computer games, movies, music, novels, photos, maps, web pages, or menu screens for organizing the content. The type of content and the channel of storing data are non-limiting so long as a subject can be represented by electronic processes. Other than common "content", the embodiment can be applied to information processing in general such as communication, schedule management, address list management, spreadsheet, etc., which will also be referred to as "content" in the following description.

For example, if the content is a game, the content storage unit 16 stores a game program, player information, level reached in a previous play, etc. If the content is a movie or music, the content storage unit 16 stores compression-coded video and audio data, a program for decoding and playing back the data, etc. The content storage unit 16 also stores image data for a graphical user interface necessary to display or process the content, and GUI arrangement information. The content file storage unit 16 may be a hard disk drive, or a combination of a removable recording medium such as a memory card, a ROM disk, an optical disk, and a magnetooptical disk and an associated reading device.

The user operation content identification unit 22 acquires an input signal from the touch panel 12 via the input and output control unit 20. The user operation content identification unit 22 identifies the content of user control intended by the user by referring to the coordinates of a point of contact included in the signal. For example, if the user touches a point on the touch panel 12 and moves the point of contact, the user operation content identification unit 22 identifies it as a screen scroll operation. If a GUI is displayed within a display image, the GUI selected by the user is identified by referring to the position of the point of contact relative to the GUI and identifies the content of user operation mapped to the GUI accordingly. The user operation content identification unit 22 communicates information necessary for processing such as the identified content of user operation and the migration path of the point of contact, to the content processing unit 24.

An operation whereby the user touches the GUI to provide input for selection will be referred to as a "touch operation". Generally, the term "touch operation" means touching an area on the touch panel 12 corresponding to the GUI (hereinafter, referred to as "hit determination area"). Meanwhile, according to the embodiment, one or more virtual points of contact are generated in the vicinity of the actual point of contact according to a predetermined rule. The GUI as selected by the user is identified by referring to, for example, the numbers of points of contact included in the hit determination areas of the GUIs.

Therefore, a "touch operation" in a broader sense is defined in the following description as occurring when a GUI available for a touch operation is located within the screen and a contact with at least one location in the screen occurs, even if the point of contact is not located directly within the hit determination area. The rule for determination that a "touch operation" occurs may vary and is non-limiting. The form of "GUI" is also non-limiting so long a touch operation designating the GUI can determine subsequent information processing. For example, a GUI may have the appearance of a user operation button, a rectangle representing a menu item, or an icon. Alternatively, a GUI may be an object located in a virtual world rendered within the screen.

In order to identify a GUI as being the one that is selected, the user operation content identification unit 22 stores, in an internal memory or the like, a contact point generation rule configuration file 26 defining a rule for generating virtual points of contact by referring to an actual point of contact, and a GUI identification rule configuration file 28 defining a rule for identifying a GUI as being the one that is selected. These configuration files may be prepared at the time of building the device. Alternatively, the files may be provided along with the content file stored in the content file storage unit 16 and read from the unit 16.

The content processing unit 24 performs a process necessary to display content by referring to information communicated from the user operation content identification unit 22 and by using the program or image data stored in the content file storage unit 16. In this process, the content processing unit 24 locates a predetermined GUI at a predetermined position as needed. Known technology may be used in actual steps of processing to suit the details of content. The display image generation unit 30 generates data for an image that should be output, by, for example, reading necessary image data from the content file storage unit 16 in accordance with a request from the content processing unit 24, and outputs the data to the input and output control unit 20. The generated image is stored in a frame buffer in the input and output control unit 20. The input and output control unit 20 outputs the data to the display 14 according to a timing schedule so as to display the image.

Figure 3:
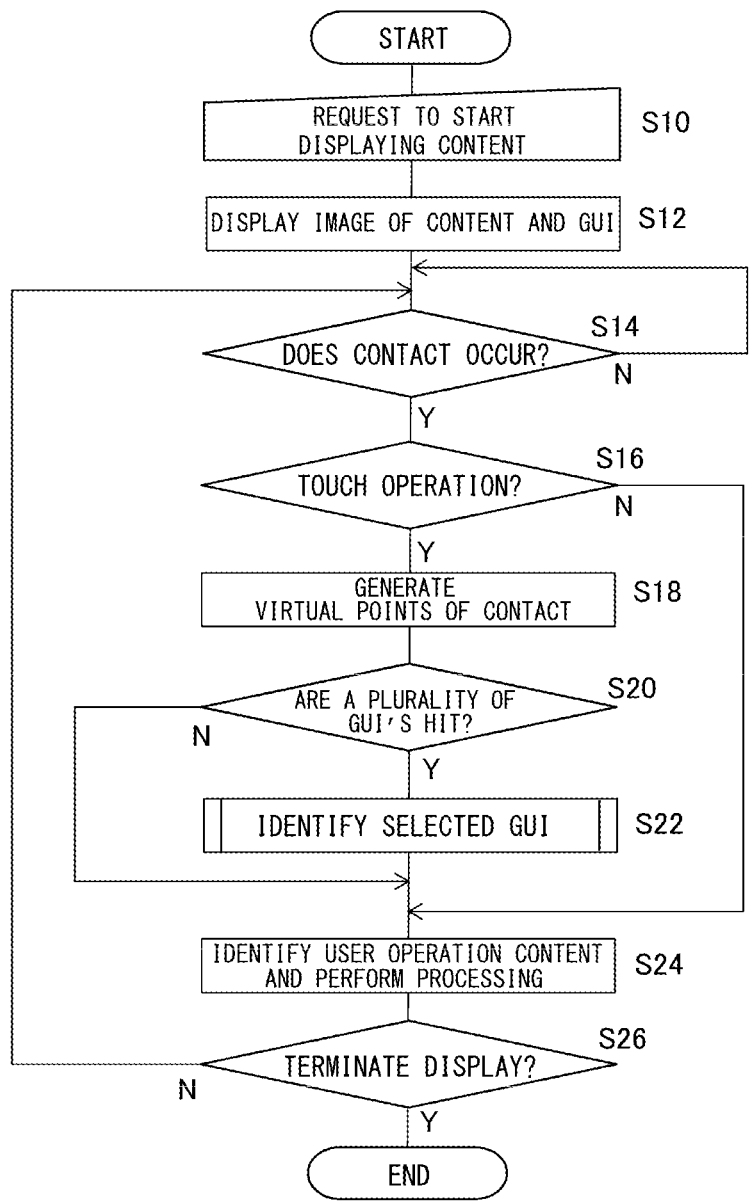
FIG. 3 is a flowchart showing the steps of acknowledging input for selecting a GUI in the information processing device according to the embodiment.

FIG. 3 is a flowchart showing the steps of acknowledging input for selecting a GUI in the information processing device 10. The user enters a request to start displaying content via the touch panel 12 by, for example, selecting content from a menu screen displayed on the display 14 (S10). The content processing unit 24 and the display image generation unit 30 then read necessary data from the content file storage unit 16 and display an image of content and an image of a necessary GUI on the display 14 (S12).

In this state, the device stands by for the user to make a physical contact with the touch panel 12 (N in S14). In this process, processes related to content that can proceed independent of the user operation may be executed and the display may be updated as needed. When a physical contact is made, the user operation content identification unit 22 senses the contact (Y in S14). If the contact is not a touch operation (e.g., screen scroll, enlargement or reduction of an image, etc.) (N in S16), the user operation content identification unit 22 identifies a user operation content mapped to the user operation and communicates the content to the content processing unit 24 along with information necessary for processing such as the migration path of the point of contact so that the content processing unit 24 performs a necessary process (S24).

If a touch operation is made (Y in S16), the user operation content identification unit 22 generates a virtual point of contact within the screen, by referring to the position of the point of contact and the rule configured in the contact point generation rule configuration file 26 (S18). The contact point generation rule configuration file 26 contains a description of the number of virtual points of contact to be generated, form of distribution, size of a distribution area, etc. The user operation content identification unit 22 extracts a point of contact within the hit determination area defined for each GUI, regardless of whether the point of contact is virtual or real.

Hereinafter, the state in which the point of contact is located within any of the hit determination areas will be referred to as a "hit" of the corresponding GUI, and the number of points of contact within the hit determination area of the GUI will be referred to as "hit score" of the GUI. If the points of contact are located within the hit determination area of only one GUI, i.e., if a single GUI is only hit (N in S20), the GUI is identified as being the one that is selected. By communicating the content of user operation mapped to the GUI to the content processing unit 24, the content processing unit 24 performs an appropriate process (S24).

If, on the other hand, a plurality of GUI's are hit (Y in S20), the user operation content identification unit 22 identifies a single GUI as being the one that is selected in accordance with the GUI identification rule configuration file 28 (S22). The GUI identification rule configuration file 28 contains a description of definition of parameters for identifying a GUI, including the hit score, priority, score acquired by weighed addition of the hit score and the priority, etc. The GUI identification rule configuration file 28 also contains a description of a rule for identifying a single GUI based on the parameters.

By identifying the GUI as being the one that is selected and communicating the user operation content mapped to the GUI to the content processing unit 24, the content processing unit 24 performs an appropriate process (S24). Absent a user input designating termination of the display of content (N in S26), S14 through S24 are repeated. If input designating termination of the display is provided, the process is terminated (Y in S26).

Figure 4:
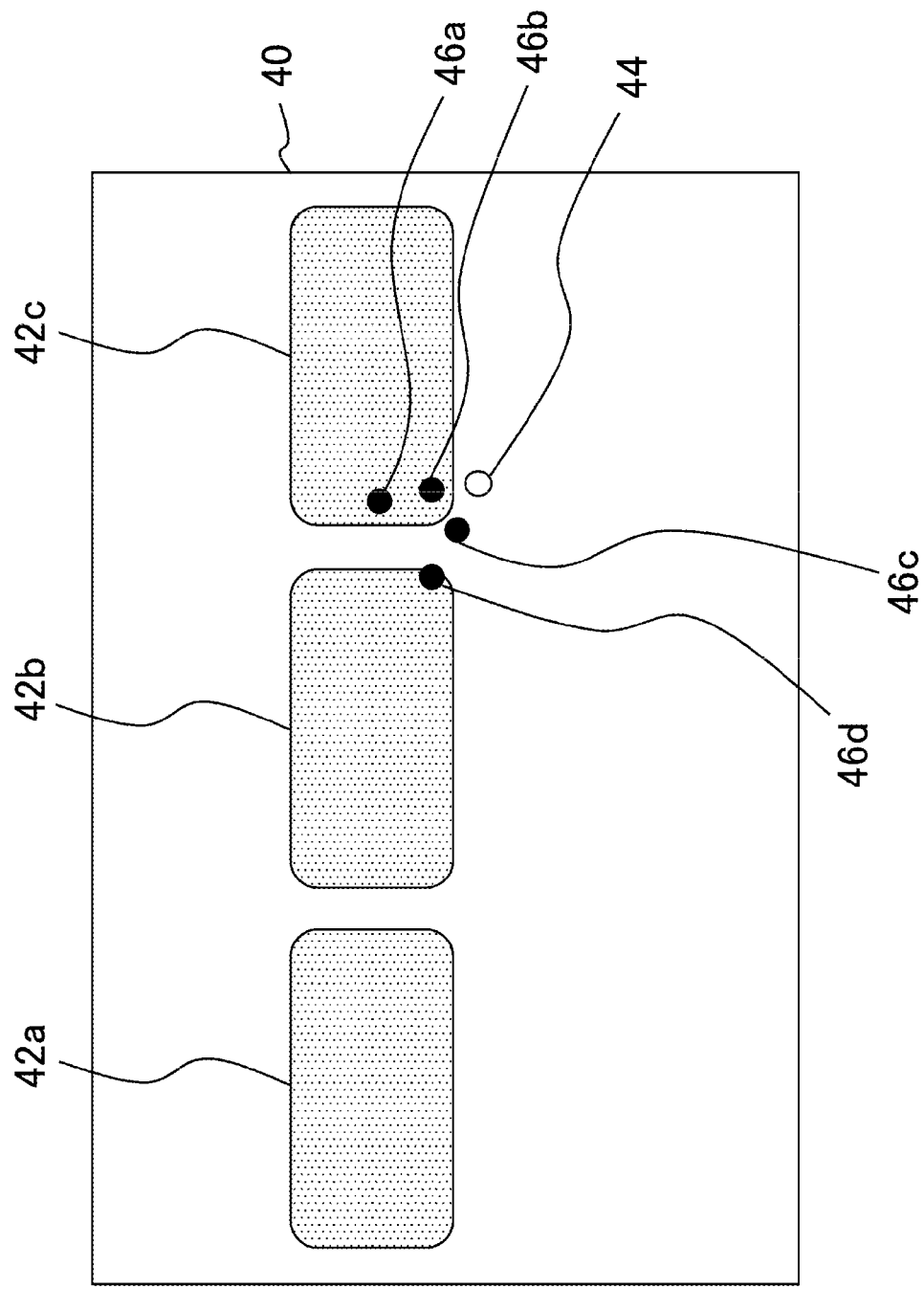
FIG. 4 shows an exemplary process performed by the user operation content identification unit according to the embodiment in the event of a touch operation.

FIG. 4 shows an exemplary process performed by the user operation content identification unit 22 in the event of a touch operation. By way of example, it will be assumed that three GUI's are displayed as options available for selection in the screen 40 of the display 14, i.e., a first GUI 42*a*, a second GUI 42*b*, and a third GUI 42*c*. The hit determination area of each GUI is defined as an area within the graphic of the GUI. When the user performs a touch operation at a point of contact 44, the user operation content identification unit 22 generates, for example, four virtual points of contact 46*a*, 46*b*, 46*c*, and 46*d* within the screen. In the illustrated case, the virtual points of contact 46*a*, 46*b*, 46*c*, and 46*d* are distributed in a the shape of a 'V' having an apex at the actual point of contact 44. Circles indicating the point of contact 44 and the virtual points of contact 46*a*, 46*b*, 46*c*, and 46*d* symbolize positions on the plane forming the screen and are not displayed as such images.

Of the total of five points of contact including the virtual points of contact generated, one point of contact 46*d* is located within the hit determination area of the second GUI 42*b* and two points of contact 46*a* and 46*b* are located within the hit determination area of the third GUI 42*c*. In other words, the second GUI 42*b* and the third GUI 42*c* are hit. The hit score of the second GUI 42*b* is "1", and the hit score of the third GUI 42*c* is "2". If a rule that requires selecting a GUI with the highest hit score is defined in the GUI identification rule configuration file 28, the user operation identification unit 22 identifies the third GUI 42*c* as being the one that is selected.

The virtual points of contact are distributed in the shape of a 'V' as illustrated for the following reason. If the user extends the hand from the lower side of the screen 40 to perform a touch operation, the fingertip most likely points toward the top of the screen. Generally, the user performing a touch operation while viewing the screen 40 often touches an area below the center of the graphic of the GUI desired to be selected, and, in some cases, the neighborhood of the lower end of the GUI. The tendency is taken advantage of so that, in a device in which the finger is expected to be oriented in such a manner, virtual points of contact are distributed more toward the top of the screen than the actual point of contact.

Further, users who use the right hand finger for user operation tend to touch the bottom right of the GUI and users who use the left hand finger for user operation tend to touch the bottom left of the GUI. In other words, the GUI desired to be selected is more likely located more toward top left than the actual point of contact if the user uses the right hand for operation. Conversely, the GUI desired to be selected is more likely located more toward top right than the actual point of contact if the user uses the left hand for operation. Therefore, the GUI desired to be selected is identified with high precision irrespective of whether the user uses the left hand or the right hand for user operation, by distributing the points of contact in the shape of a 'V'. Generalizing this principle, it should be said that virtual points of contact are desirably distributed toward the tip of the finger in an area around the point of contact.

Figure 5:
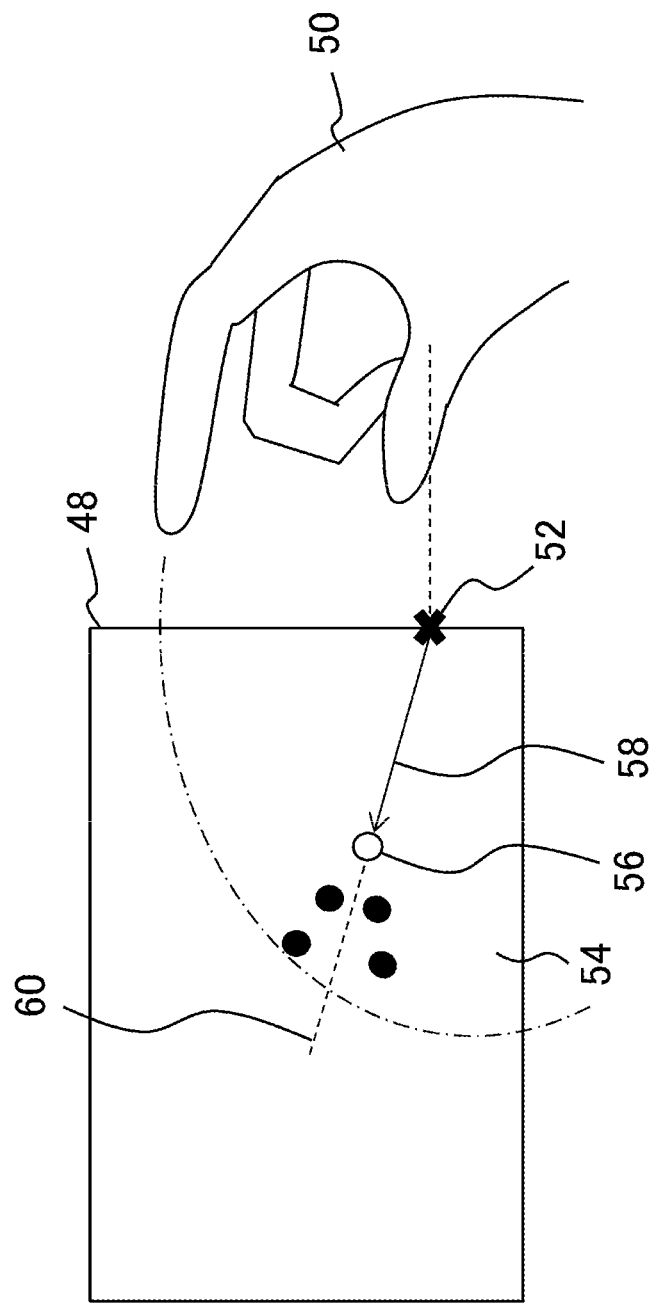
FIG. 5 shows a method of determining the inclination of the shape of a 'V' formed by the points of contact according to the embodiment.

FIG. 5 shows a method of determining the inclination of the shape of a 'V' formed by the points of contact shown in FIG. 4, by using the above-described principle. In this example, it is assumed that the information processing device 10 is held horizontally, and the thumb and the index finger located above the screen are used to control the touch panel 12. The right hand 50 of the user holding the information processing device 10 is shown on the right hand side of the figure. Generally, the base of the thumb will be located at the lower right end of the screen 48 (e.g., a position 52 in the figure). By adjusting the orientation of the finger or the reach around the position, the touch operation with the thumb is performed.

Therefore, the thumb moves in the range shaped like a fan around the position 52 at the base (an area 54 in the figure). By predefining the position 52 of the base, the orientation of the thumb is represented by a vector 58 starting at the position 52 and ending at the actual point of contact 56. As noted above, the GUI desired to be selected is likely to be located in the neighborhood of the tip of the finger, the GUI is identified with high precision by distributing virtual points of contact in an area around the point of contact 56, and, in particular, toward the tip of the finger, i.e., around a line 60 extended from the vector 58.

In the illustrated example, virtual points of contact are distributed in the shape of a 'V' in a symmetrical manner with respect to the line 60. Points of contact can also be distributed in the neighborhood of the tip of the finger in case the index finger or the left hand is used for user operation, by defining the position of the base of the finger as a starting point. Blocks within the screen may be mapped to fingers brought into contact with an area within the block, by referring to the range of movement (e.g., the area 54) of the respective fingers. By switching the position of the base depending on the block that is touched, the GUI can be identified with equal precision regardless of the finger used for user operation. The position 52 of the base may be estimated based on the shape of the device or the configuration of the screen. Alternatively, the position 52 of the base in the device may be marked so that the user may adjust the position of holding accordingly.

Figures 6, 7:
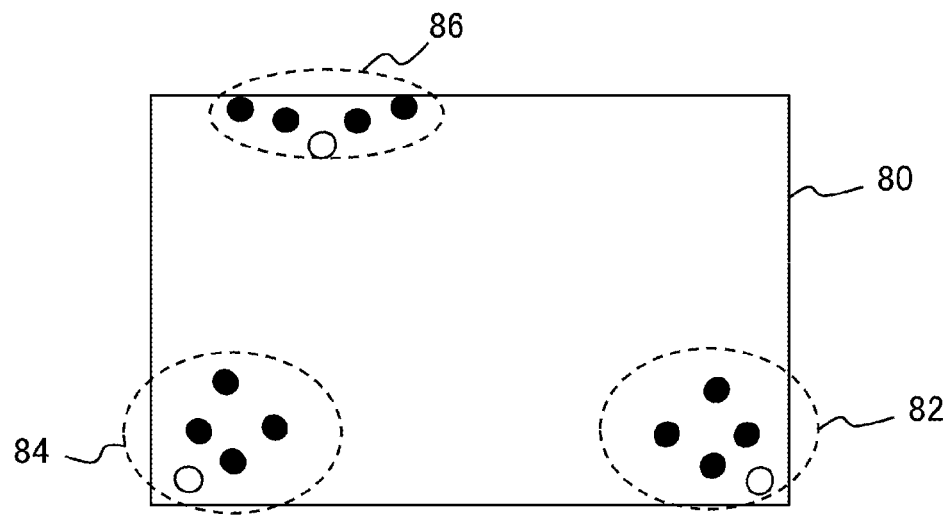
FIG. 6 shows exemplary data described in the contact point generation rule configuration file in order to generate virtual points of contact according to the embodiment.
FIG. 7 shows another exemplary rule for generating virtual points of contact according to the embodiment.

FIG. 6 shows exemplary data described in the contact point generation rule configuration file 26 in order to generate virtual points of contact shown in FIG. 5. The contact point generation rule configuration file 26 contains a shape field 72, a size field 74, a count field 76, and a starting point field 78. The shape of distribution of points of contact is entered in the shape field 72. In the example of FIG. 5, the field contains an entry "V". The vertical and horizontal sizes of the shape of distribution when represented with a normal orientation are entered in the size field 74. The illustrated example indicates that the shape of a 'V' not inclined is sized 5 mm×5 mm.

The number of virtual points of contact to be generated is entered in the count field 76. In the example of FIG. 5, "4" is entered. Information indicating the position of the base of the finger used for user operation, e.g., the coordinates (X1, Y1) in the screen coordinate system, is entered in the starting point field 78. Units of defining the size or position or methods of representation are non-limiting. If it is expected that multiple hands or fingers are used for operation, associated data are prepared. The table may further include a field for defining one of blocks within the screen depending on which the position of the base is switched.

Other than by the example shown in FIGS. 5 and 6, precision of identifying the GUI can be maintained across various environments by optimizing the distribution of virtual points of contact depending on the device, screen configuration, and the like. Factors that determine optimum distribution include factors dependent on the appearance of the information processing device and factors determined by content. The former include whether the information processing device is held by the hands or placed on a desk, an angle of tilt of the screen, whether the device is controlled with the hand which holds the device, the condition of the hand which holds the device, the position at which the device is held, etc. The latter include the arrangement of GUI's, whether the screen is viewed vertically or horizontally, etc.

In case a display and a touch panel are built in the top plate of a table so that the user views the screen from immediately above, the tip of the finger used for a touch operation generally faces the display vertically downward. In this case, the GUI desired to be selected is considered to be located in the area around the point of contact with uniform probability. Therefore, virtual points of contact may be distributed circularly and evenly around the actual point of contact. In this case, the starting point field 78 in FIG. 6 is not necessary. Depending on the factors described above, the distribution may be in the shape of a 'Y' instead of a 'V'.

Alternatively, virtual points of contact may be distributed along a straight line or a curved line that passes through the actual point of contact.

In any case, it is desirable to determine a distribution that allows highly precise identification of a GUI desired to be selected, in light of the tendency of relative positions determined by the factors. For determination, vector-based calculation may be made on an assumption that the GUI is likely to be located toward the tip of the finger, as described above. Alternatively, optimum distribution may be derived on a statistical basis by repeating experimental touch operations under different conditions. Still alternatively, calibration may be performed by prompting the user to touch a test image when the initial operation of the device or content is run initially. The distribution may be further optimized in light of the tendency of user-specific operation, length of the finger, hand dominance, etc. The data structure of the contact point generation rule configuration file 26 may be changed as appropriate in accordance with the determined distribution.

If the sensor 15 is available to obtain information related to the hand or finger used for an actual user operation, the user operation content identification unit 22 may adaptively update the configuration in the contact point generation rule configuration file 26 based on the information. For example, if an additional touch panel is provided on the rear face of the information processing device 10 so that the position of the middle finger supporting the device at the rear face can be acquired, the assumed positions of the base of the thumb and that of the index finger are derived based on the position of the middle finger and the size of an ordinary hand, and the starting point field 78 in the contact point generation rule configuration file 26 is updated as needed.

If the angle of the tilt of the screen can be acquired by providing an acceleration sensor or a gyro sensor inside the information processing device 10, the shape field 72 in the contact point generation rule configuration file 26 is updated by the angle of the tilt of the screen as appropriate. For example, if the screen faces vertically upward, the entry in the shape field 72 is changed from "V" to "circular" according to the principle described above. In this case, the angle of the tilt of the screen and the optimum distribution shape are mapped to one another in a separate file. If a camera or a sensor capable of acquiring the shadow or figure of a finger is provided in the display 14 so that a two-dimensional image of a finger used for user operation can be acquired, the starting point field 78 will not be necessary because the orientation of the fingertip is known without requiring vector computation. In this case, the subsequent process will be the same as described above by using the orientation of the fingertip instead of the vector.

FIG. 7 shows another exemplary rule for generating virtual points of contact. The V-shaped distribution of points of contact is similar to that of FIG. 5. Meanwhile, in the example shown, the orientation and size of a 'V' are determined depending on the relation between the point of contact and the frame of a screen 80. For example, if the point of contact is located at bottom right of the screen 80, it will not be efficient to generate virtual points of contact in the vicinity of the lower edge or right edge of the screen 80 regardless of the orientation of the finger, if no GUI's are located in that direction.

In this case, virtual points of contact are distributed around a line extending toward top left from the point of contact at a certain angle, as indicated by a V-shape distribution 82. In this process, the spread of a 'V' may be narrowed depending on the arrangement of GUI's (e.g., absence of GUI's at the edges of the screen). The same holds true of the point of contact located at bottom left of the screen 80. Virtual points of contact are distributed around a line extending toward top right from the point of contact at a certain angle (V-shape distribution 84). If a GUI is located near the top edge of the screen 80 and if the actual point of contact is located in the vicinity below, the spread of a 'V' is enlarged and the vertical size is reduced so that the virtual points of contact are accommodated within the screen 80 (V-shaped distribution 86). Similarly, if there is a rule that should be referred to in priority to the orientation of the fingertip depending on the relationship between the edges of the screen and the point of contact or the relationship between the arrangement of GUI's and the point of contact, such a rule may be determined to suit the device or content and configured in the contact point generation rule configuration file 26.

Figure 8:
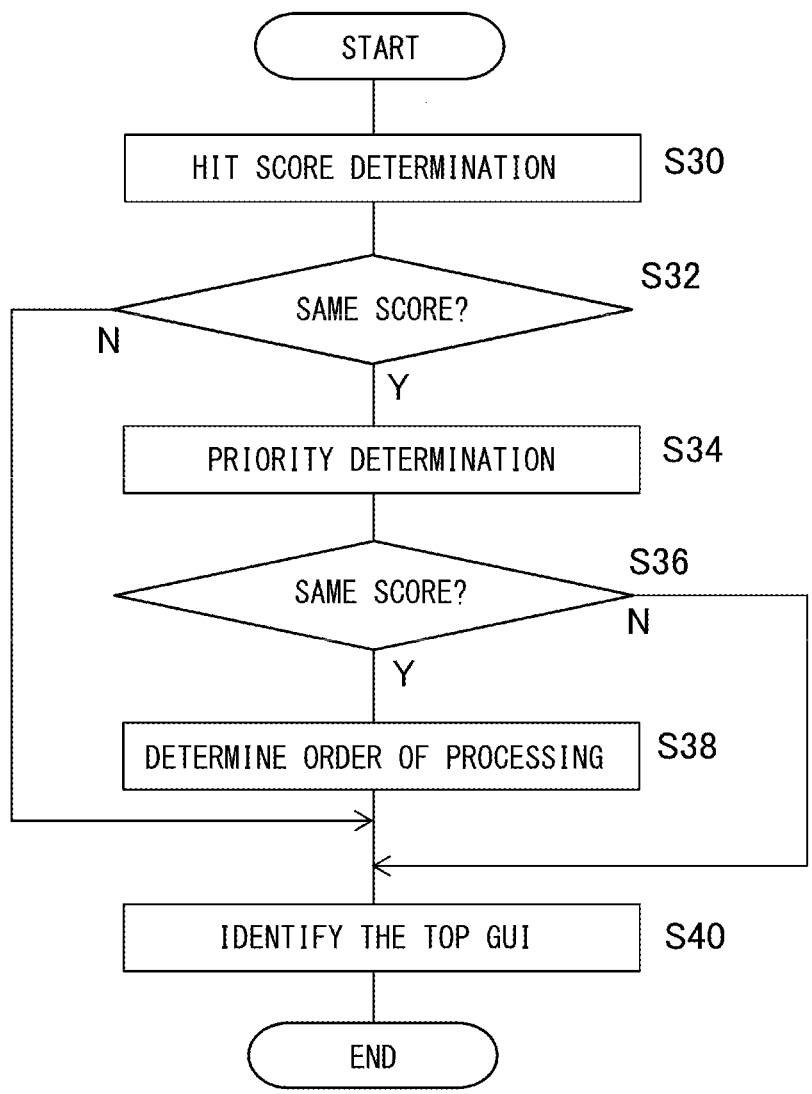
FIG. 8 is a flowchart showing the steps whereby the user operation content identification unit selects one of a plurality of hit GUI's.

FIG. 8 is a flowchart showing the steps whereby the user operation content identification unit 22 selects one of a plurality of hit GUI's. These steps exemplify a rule that can be variably set in the GUI identification rule configuration file 28. A hit score determination is performed for a plurality of hit GUI's (S30). More specifically, the hit scores, i.e., the numbers of points of contact located within the respective hit determination areas, are acquired for each of the plurality of GUI's and the scores are compared. If the hit score of one of the GUI's is higher than that of the other GUI's (N in S32), the GUI is identified as the selected GUI (S40).

In the hit score determination process of S30, the points of contact may be weighed according to a predetermined rule. For example, a hit at the actual point of contact by the user is multiplied by a certain coefficient so as to be assigned a higher weight than each of the virtual points of contact, to which 1 point is assigned. Alternatively, all points of contact may be multiplied by a coefficient which decreases with the increase of distance from the actual point of contact so that the weight of the point of contact is varied depending on the distance. This gives the highest weight to the actual point of contact for identification of a GUI.

Meanwhile, if a plurality of GUI's are associated with the same maximum score (Y in S32), the GUI's are subject to a priority determination (S34). Depending on the number of virtual points of contact generated, GUI's may be determined to have the "same score" if the difference in score is a predetermined threshold value or less. For priority determination, a numerical value indicating priority is assigned to each GUI. For example, 5 levels of priority may be defined. Numerals 1 through 5 are assigned to the GUI's depending on the content of the GUI. If two buttons "Delete" and "Cancel" are displayed side by side to prompt the user to verify whether a file or data should be deleted, deletion of data by an error in operation is prevented by assigning higher priority to the "Cancel" button than the "Delete" button.

The priority levels of the target GUI's are compared. If the priority level of one of the GUI's is higher than the other (N in S36), the GUI is identified as being the one that is selected (S40). On the other hand, if a plurality of GUI's are assigned the same maximum priority levels (Y in S36), the GUI's are examined to determine the order of processing (S38). In this step, the order of processing in the program for displaying GUI's is subject to comparison. The GUI processed the earliest is identified as being the one that is selected (S40). Through these steps, one GUI is identified at least in one of the stages. The order of priority determination and hit score determination may be reversed depending on the details of content. Whether the order is reversed or not, the GUI identification rule configuration file 28 defines the order.

According to the embodiment described above, virtual points of contact are generated based on the point of contact touched as the user provides input to select a GUI displayed on the screen. The GUI desired to be selected is estimated and identified by referring to whether points of contact are located within the hit determination area of the GUI and/or the number of points of contact within the area. According to the related art in which a touch on a GUI is acknowledged, a hit determination area is defined to include a margin area around the graphic of the GUI to produce a response even if the user touches a position slightly distanced from the graphic of the GUI. However, as the screen is heavily crowded with GUI's due to a large number of GUI's displayed or small display space, an arrangement to ensure that hit determination areas do not overlap or a special process to address a touch on overlapping areas will be required.

The crowdedness of GUI's is dependent on the configuration of a screen showing content, the area of a display, etc. Therefore, the hit determination area should be redefined at the time of creating content to suit different situations, even if GUI parts can be reused. This has imposed a load to creators. According to the embodiment, virtual points of contact are generated so that, even if a contact occurs at a position at a certain distance from a GUI, the GUI in the neighborhood is likely to be hit. This eliminates the need to include a margin area in the hit determination area. The hit determination area may be defined to be of the same size as the graphic of a GUI. As a result, adjustment relative to the hit determination area as described above will no longer be necessary so that the load on content creators is reduced.

The number of virtual points of contact generated, the distribution shape, and the size of the area of distribution are determined by device-specific conditions such as the shape of the device or the way that the device is expected to be held and by content-specific conditions such as the arrangement of GUI's or the screen configuration. This ensures that the GUI desired to be selected is identified with high precision and save trouble such as absence of a response due to a contact that misses the hit determination by a small margin or identification of a GUI different from the one desired. As a result, easiness of content creation and high operability in a touch operation can be achieved at the same time.

Described above is an explanation based on an exemplary embodiment. The embodiment is intended to be illustrative only and it will be obvious to those skilled in the art that various modifications to constituting elements and processes could be developed and that such modifications are also within the scope of the present invention.

According to the embodiment, a target GUI is identified, prompted by a touch operation on a touch panel. However, a similar process can be applied to an input means other than a touch panel. For example, if the display is provided with a sensor capable of acquiring the shadow or figure of a finger or a pointer, the position indicated by the shadow or figure may be used in place of the point of contact according to the embodiment. Applications of the embodiment include a system in which an image is projected onto a wall or a floor by using a projector, and variation in the image dependent on the position of the user's hand or foot is produced by capturing the shadow or figure of the user located in front of the image, by using a camera or a sensor. In this case, virtual points of designation are generated in the vicinity of the position recognized as being the location of the user's hand or foot, and a determination similar to the one of the embodiment is performed so as to identify the portion in which the intended variation should be induced. If the hand or foot is recognized as a point, variation as intended may not be captured due to slight displacement. By generating virtual points of designation, such displacement is canceled and highly precise processing is achieved.

In further accordance with the embodiment, the GUI desired to be selected can be identified with high precision even if the point of contact is slightly removed from the graphic of the GUI. This feature can be taken advantage of such that, when the identified GUI is removed from the actual point of contact, the graphic of the GUI itself is moved as if attracted by and adhered to the finger. If the GUI selected by a touch operation is moved to a different position within the screen by a drag operation, the GUI remains adhered to the finger through the drag operation. Therefore, the user can experience more natural operation. In this case, an animation may be displayed by using a known technology, showing the center of the selected GUI moving to the actual point of contact.

What is claimed is:

1. An information processing device having a processor comprising:
    an input and output control unit configured to acquire, using the processor, a position of a single point of designation designated by a user in a display image including graphical user interfaces (GUIs) shown on a display screen;
    a user operation content identification unit configured to simultaneously generate multiple points which are not displayed with a predetermined pattern at positions determined according to the position of the single point of designation on a plane that forms the display image, to acquire a hit score for each GUI, the hit score being a number of the multiple points and the single point of designation inside hit determination areas defined for respective GUIs, and to select a single GUI with a highest score as a selected GUI; and
    a content processing unit is configured to execute a process mapped to the selected GUI,
    wherein the user operation content identification unit distributes the multiple points in a shape of a 'V' having an apex on the single point of designation when the information processing device is held by the user, and distributes the multiple points circularly and evenly around the single point of designation when the information processing device is not held by the user,
    wherein, when the information processing device is held by the user, the input and output control unit acquires the single point of designation as a single point of contact on the touch panel by a finger of a hand holding the information processing device, and
    wherein the user operation content identification unit refers to a position at a base of the finger of the hand holding the information processing device and defines a direction of a vector, extending from the position at the base of the finger to the single point of contact, as the direction of a tip of the finger and distributes the multiple points around a line extended from the vector in the direction of the vector.

2. The information processing device according to claim 1, wherein the user operation content identification unit arranges the multiple points with the predetermined pattern defined in association with the device or the display image.

3. The information processing device according to claim 1, further comprising: a rear touch panel configured to sense a position of a finger supporting the information processing device from behind, wherein the user operation content identification unit identifies the position of the base of the finger, based on the position sensed by the rear touch panel and a size of the hand holding the information processing device.

4. The information processing device according to claim 1, further comprising: a sensor configured to acquire an angle of tilt of the display screen, wherein the user operation content identification unit changes the distribution of the multiple points in accordance with the angle of the tilt of the display screen by referring to a file where the angle of tilt and an optimum distribution shape are mapped together.

5. The information processing device according to claim 1, further comprising: a sensor configured to acquire an image of the finger on the display screen, wherein the user operation content identification unit identifies a direction of the tip of the finger based on the image of the finger and distributes the multiple points around the identified direction.

6. The information processing device according to claim 1, wherein the user operation content identification unit switches the position at the base of the finger depending on a region including the single point of contact on the touch panel.

7. The information processing device according to claim 1, wherein the position at the base of the finger is marked on the information processing device so that a user adjusts the position of the hand holding accordingly.

8. The information processing device according to claim 1,
wherein the user operation content identification unit distributes the multiple points in a shape of 'Y', a straight line or a curved line that passes through the single point of contact on the touch panel depending on an information processing device or screen configuration.

9. The information processing device according to claim 1, wherein the user operation content identification unit changes an orientation and a size of the 'V' depending on a relation between the single point of contact and an edge of the touch panel.

10. The information processing device according to claim 1, wherein the user operation content identification unit changes a width of the 'V' depending on a relation between positions of the single point of contact, GUIs, and an edge of the touch panel.

11. An information processing method comprising:
acquiring a position of a single point of designation designated by a user in a display image including graphical user interfaces (GUIs);
simultaneously generating multiple points which are not displayed with a predetermined pattern at positions determined according to the single position of the point of designation on a plane that forms the display image,
acquiring a hit score for each GUI, the hit score being a number of the multiple points and the single point of designation inside hit determination areas defined for respective GUIs,
selecting a single GUI with a highest score as a selected GUI; and
executing information processing mapped to the selected GUI,
wherein the generating distributes the multiple points in a shape of 'V' having an apex on the single point of designation when an information processing device is held by the user, and distributes the multiple points circularly and evenly around the single point of designation when the information processing device is not held by the user,
wherein, when the information processing device is held by the user, the single point of designation is set as a single point of contact on the touch panel of a finger of a hand holding the information processing device, and
wherein the generating refers to a position at a base of the finger of the hand holding the information processing device and defines a direction of a vector, extending from the position at the base of the finger to the single point of contact, as the direction of a tip of the finger and distributes the multiple points around a line extended from the vector in the direction of the vector.

12. A non-transitory computer-readable recording medium encoded with a computer program comprising:
a module configured to acquire a position of a single point of designation designated by a user in a display image including graphical user interfaces (GUIs);
a module configured to simultaneously generate multiple points which are not displayed with a predetermined pattern at positions determined according to the position of the single point of designation on a plane that forms the display image, to acquire a hit score for each GUI, the hit score being a number of the multiple points and the single point of designation inside hit determination areas defined for respective GUIs, and to select a single GUI with a highest score as a selected GUI; and
a module configured to execute information processing mapped to the selected GUI, wherein
the module configured to generate the multiple points distributes the multiple points in a shape of 'V' having an apex on the single point of designation when the computer is held by the user, and distributes the multiple points circularly and evenly around the single point of designation when the computer is not held by the user,
wherein, when the information processing device is held by the user, the module configured to acquire the position of the single point of designation acquires the single point of designation as a single point of contact on the touch panel by a finger of a hand holding the information processing device, and
wherein the module configured to generate the multiple points refers to a position at a base of the finger of the hand holding the information processing device and defines a direction of a vector, extending from the position at the base of the finger to the single point of contact, as the direction of a tip of the finger and distributes the multiple points around a line extended from the vector in the direction of the vector.

13. A non-transitory computer-readable recording medium in which data of a content file is recorded, the data having a structure configured to map:
a program of content executed in an information processing device; to
a contact point generation rule configuration file configured to define a rule for simultaneously generating multiple points which are not displayed with a predetermined pattern at positions determined according to a position of a single point of designation, on a plane that forms a display image including graphical user interfaces (GUIs) displayed while content is being executed in the information processing device, the contact point generation rule configuration file being used to acquire a hit score for each GUI, the hit score being a number of the multiple points and the single point of designation inside hit determination areas defined for respective GUIs, to select a single GUI with a highest score as a selected GUI and to execute a process mapped to the selected GUI, wherein the multiple points are distributed in a shape of 'V' having on apex at the single point of designation when the information processing device is held by the user, and are distributed the multiple points circularly and evenly around the single point of designation when the information processing device is not held by the user, wherein, when the information processing device is held by the user, the single point of designation is set as a single point of contact on the touch panel of a finger of a hand holding the information processing device, and wherein the contact point generating rule refers to a position at a base of the finger of the hand holding the information processing device and defines a direction of a vector, extending from the position at the base of the finger to the single point of contact, as the direction of a tip of the finger and distributes the multiple points around a line extended from the vector in the direction of the vector.

* * * * *